Figure 1:
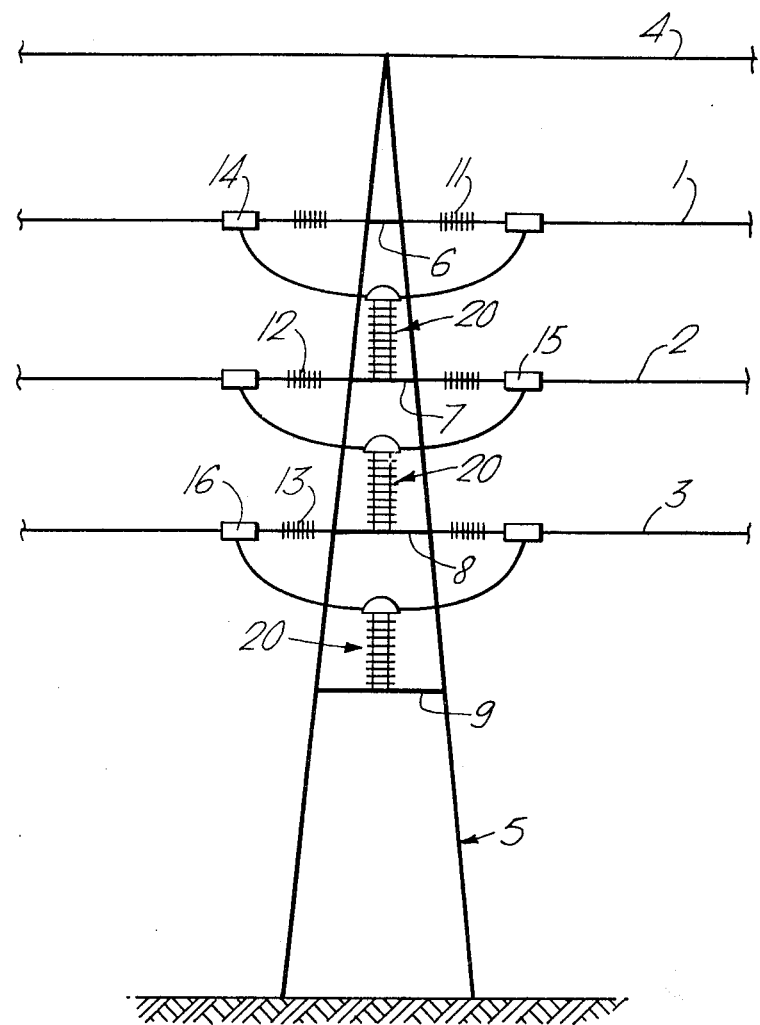

United States Patent [19]

Dey et al.

[11] 4,409,428

[45] Oct. 11, 1983

[54] OVERHEAD ELECTRIC TRANSMISSION SYSTEMS

[75] Inventors: Philip Dey, New Barnet; Ronald Dunkley, High Wycombe; Graham Holden, Bradshaw, all of England

[73] Assignee: BICC Public Limited Company, London, England

[21] Appl. No.: 382,596

[22] Filed: May 27, 1982

[30] Foreign Application Priority Data

Jun. 3, 1981 [GB] United Kingdom ............... 8116960

[51] Int. Cl.³ .................. H02G 7/00; H01B 17/44
[52] U.S. Cl. ................................ 174/43; 174/30; 174/65 SS; 174/139; 174/140 R
[58] Field of Search .............. 174/30, 40 R, 43, 45 R, 174/139, 140 R, 140 CR; 350/96.23

[56] References Cited

U.S. PATENT DOCUMENTS 3,485,940 12/1969 Perry et al. ..................... 174/139

FOREIGN PATENT DOCUMENTS 2901872 7/1980 Fed. Rep. of Germany ... 350/96.23
1598438 9/1981 United Kingdom ............. 174/70 R

*Primary Examiner*—Laramie E. Askin
*Attorney, Agent, or Firm*—Buell, Blenko, Ziesenheim & Beck

[57] ABSTRACT

In an overhead electric transmission system in which the phase conductors incorporate optical fibres, a joint between optical fibres of two phase conductors or between optical fibres of a phase conductor and an optical cable extending to a sub-station is enclosed within a fluid-tight metal housing. The housing is electrically connected to each phase conductor, is electrically insulated from earth, and has an external shape of such a form as to provide effective control of electrical stress. Preferably the metal housing is of hemi-spherical shape and is mounted on top of a porcelain insulator containing oil under pressure. Where an optical fibre connected at the joint is that of an optical cable, it passes into the metal housing through the oil filled porcelain insulator.

15 Claims, 4 Drawing Figures

OVERHEAD ELECTRIC TRANSMISSION SYSTEMS

This invention relates to overhead electric transmission systems of the kind in which one or more than one overhead electric conductor is freely supported in long lengths between pylons, towers, masts or other upstanding supports mutually spaced along the system, all such supports, for convenience, being included in the generic term "tower". The invention is particularly concerned with overhead electric transmission systems of this kind in which the overhead electric conductor, or at least one of the overhead electric conductors, includes at least one optical guide for the transmission of the ultraviolet, visible and infra-red regions of the electromagnetic spectrum, which regions, for convenience, hereinafter will all be included in the generic term "light".

One form of overhead electric conductor including at least one optical guide for use in the communications field adapted for transmission of light, is described and claimed in the Complete Specification of U.K. Pat. No. 1,598,438 and comprises at least one layer of helically wound bare elongate elements of metal or metal alloy, at least one compartment within and extending throughout the length of the overhead conductor and, loosely housed in the elongate compartment or in at least one of the elongate compartments, at least one separate optical fibre and/or at least one optical bundle.

By the expression "optical bundle" is meant a group of optical fibres or a group of fibres including at least one optical fibre and including at least one non-optical reinforcing fibre or other reinforcing elongate member.

An overhead electric transmission system of the aforesaid kind in which the overhead electric conductor, or at least one of the overhead electric conductors, includes at least one separate optical fibre and/or optical bundle for the transmission of light, will hereinafter, for convenience, be referred to as "an overhead electric transmission system of the kind described".

In an overhead electric transmission system of the kind described, it is usually necessary at spaced positions along the system to effect a joint between the optical fibres and/or bundles of two overhead electric conductors suspended from a tower or between the optical fibres and/or bundles of an overhead electric conductor suspended from a tower and of a cable extending to a sub-station or other location. Where the or each overhead electric conductor is the earth conductor of the system, the joint between the optical fibres and/or bundles can be effected with no difficulty. However, where the or each overhead electric conductor is a live conductor of the system, precautions have to be taken to ensure that the joint between the optical fibres and/or bundles is electrically isolated with respect to earth.

It is an object of the present invention to provide, in an overhead electric transmission system of the kind described, a joint between optical fibres and/or bundles of two overhead electric conductors suspended from a tower, or between optical fibres and/or bundles of an overhead electric conductor suspended from a tower and of a cable extending to a sub-station or other location, in which each or the overhead electric conductor constitutes a live conductor of the system.

According to the invention, the joint between the optical fibres and/or bundles is enclosed within a substantially fluid-tight housing of metal or metal alloy, which housing is electrically connected to each or the said overhead electric conductor, is electrically insulated from earth, and has an external shape of such a form as to provide effective control of electrical stress.

Preferably, the metal housing comprises a substantially flat base and, detachably secured to the base, a separately formed dome of substantially hemi-spherical shape.

The or each overhead electric conductor whose optical fibre/s and/or bundle/s is to be connected at the joint, preferably passes into, and effects a substantially fluid-tight seal with a wall of, the metal housing, preferably at a position adjacent the base of the housing.

Preferably, the or each joint between the optical fibres and/or bundles is itself housed in a substantially fluid-tight enclosure of plastic material, which enclosure is directly or indirectly supported within the metal housing and where, as is preferred, the plastic enclosure is filled with petroleum jelly or other water-impermeable material of a grease-like nature, each optical fibre and/or bundle effects a substantially fluid-tight seal with a wall of the plastic enclosure.

The metal housing may be electrically insulated from earth by any convenient means but, preferably, the metal housing is mounted on the upper end of an upstanding elongate housing which is made of procelain or other electrically insulating material and which may be mounted on the tower or other structure e.g. at a sub-station.

Where the optical fibres and/or bundles connected at the joint are components of an overhead electric conductor and of a cable extending to a sub-station or other location, preferably the optical fibre/s and/or bundle/s of the cable passes into the procelain housing through the lower end wall of the housing, extends upwardly through the procelain housing and enters the metal housing mounted on the upper end of the procelain housing through its base. In this case, preferably the lower end wall of the procelain housing is of electrically conductive metal or metal alloy and is earthed. The housing of procelain or other electrically insulating material is preferably at least partially filled with an electrically insulating medium in a fluid or semi-fluid state. Where the electrically insulating medium in the housing of procelain or other electrically insulating material is an insulating oil or an insulating gas, e.g. SF6, it preferably fills the housing and is preferably maintained at a positive pressure by a known device; where the electrically insulating medium in the housing is of a grease-like nature or other semi-fluid state, it need not fill the housing and may, for example, be a petroleum-based insulating grease. The circumferentially extending wall of the elongate housing of procelain or other electrically insulating material may be provided at spaced positions along its length with outwardly extending circumferential sheds.

Where the optical fibres and/or bundles connected at the joint are components of two overhead electric conductors, the electrical interconnection between the two conductors may be supplemented by at least one strap of electrically conductive metal or metal alloy secured to the metal housing and electrically interconnected between the two overhead conductors.

In all cases, preferably the metal housing supports a circumferentially continuous ring of metal or metal alloy which encircles the supporting housing of electrically insulating material and serves as a corona ring.

In addition to the joints between the optical fibres and/or bundles, the metal housing may also accommodate regenerators and/or ancilliary equipment associated with the optical communication system.

Figure 2:
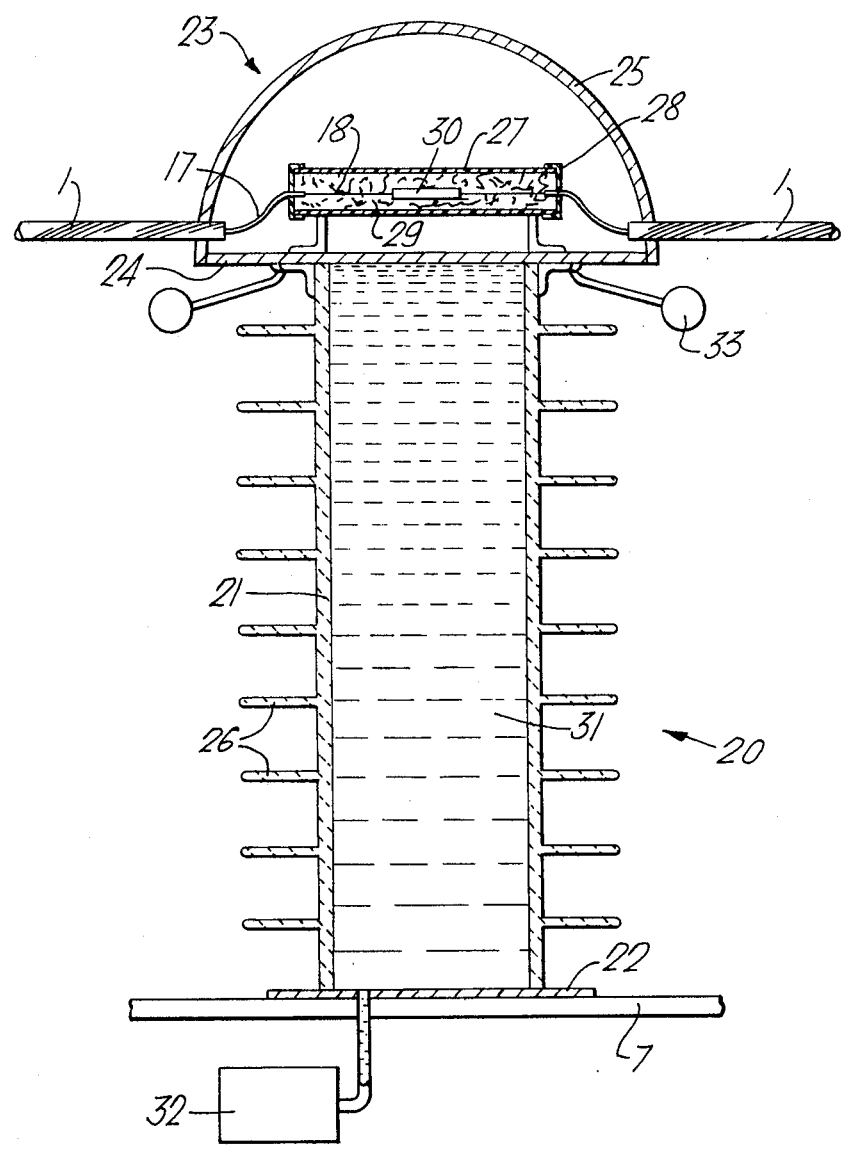
Figure 3:
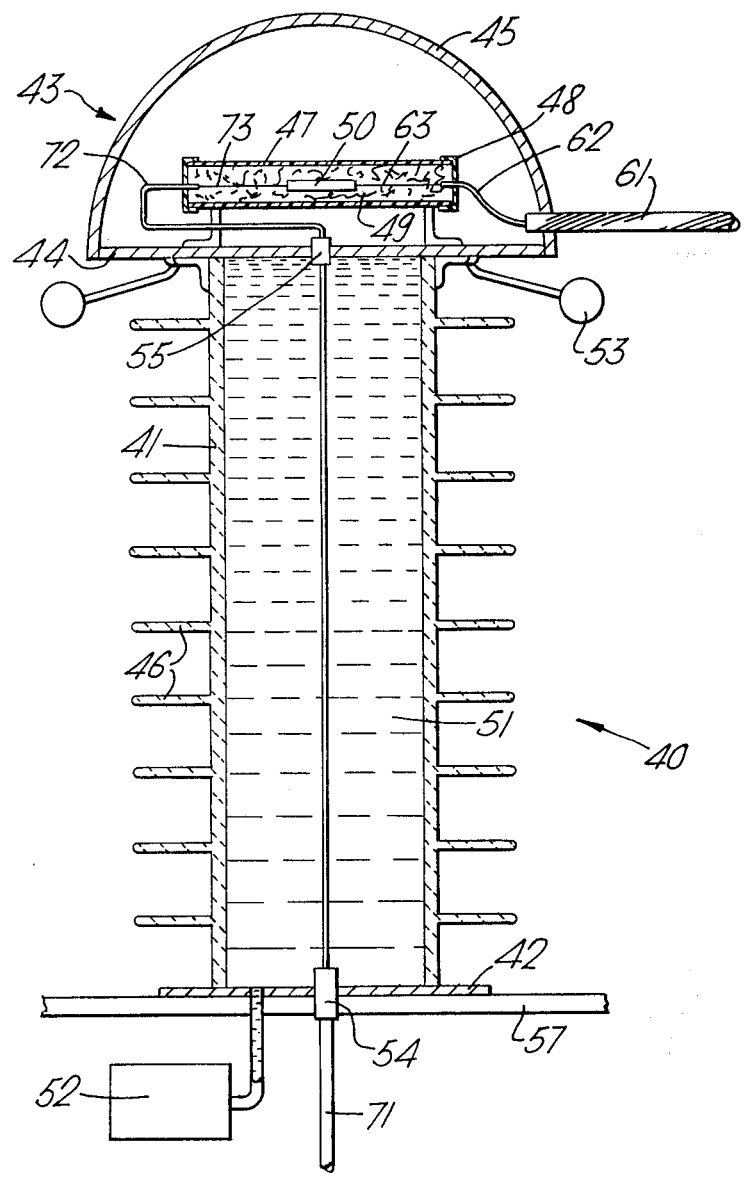
Figure 4:
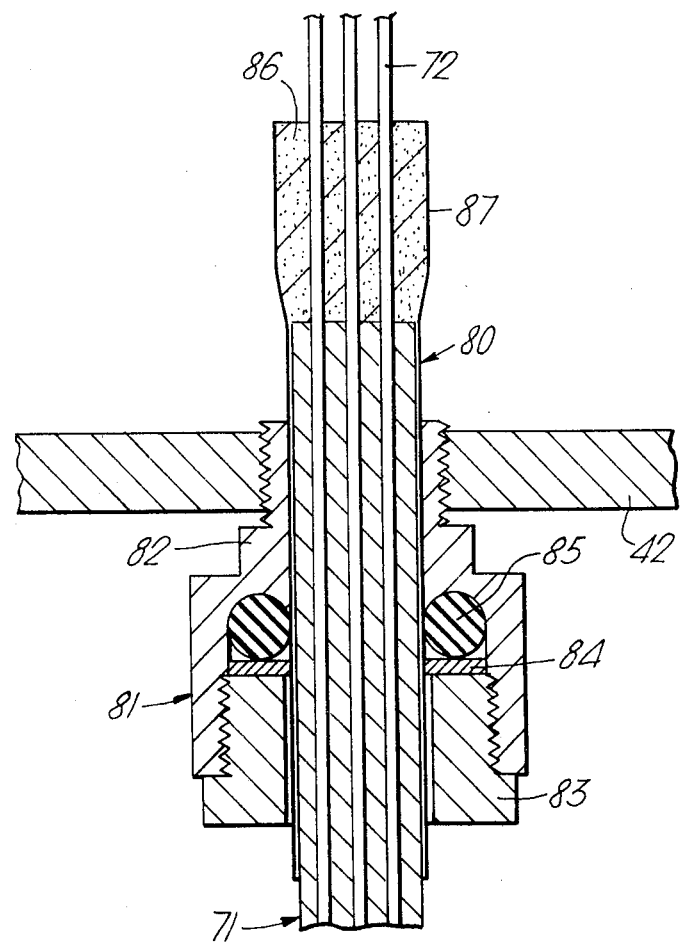

The invention is further illustrated by the following description, by way of example, with reference to the accompanying drawings, in which:

FIG. 1 is a diagrammatic side view of a tower of an overhead electric transmission system showing mounted on the tower, the housings of three optical guide joints between overhead electric conductors suspended from the tower;

FIG. 2 is a diagrammatic sectional side view of a preferred joint between optical fibres of two overhead electric conductors suspended from the tower shown in FIG. 1, FIG. 3 is a diagrammatic sectional side view of a preferred optical guide joint between optical fibres of an overhead electric conductor suspended from a tower and of an optical cable extending to a sub-station, and FIG. 4 is a sectional side view of the preferred form of fluid-tight seal arrangement by means of which an optical cable is fed into the insulating housing of a joint of the kind shown in FIG. 3.

Referring to FIGS. 1 and 2, the overhead electric transmission system comprises three phase conductors 1, 2 and 3 and an earth conductor 4 freely supported in long lengths between towers 5 at spaced positions along the system. Each phase conductor 1, 2 and 3 has a central bore extending throughout its length in which is loosely housed an optical cable element comprising a plastic tube 17 having a bore in which is loosely housed an optical fibre 18. Phase conductors 1 on opposite sides of a tower 5 are freely suspended from a cross-arm 6 on the tower by insulator strings 11 which are connected to the conductors by conventional wedge-type fittings 14; phase conductors 2 on opposite sides of the tower are freely suspended from a cross-arm 7 by insulator strings 12 connected to the conductors by wedge-type fittings 15; and phase conductors 3 on opposite sides of the tower are freely supported from a cross-arm 8 by insulator strings 13 connected to the conductors by wedge-type fittings 16. Electrical connection between phase conductors 1, 2 and 3 on opposite sides of the tower 5 and the optical connection between optical fibres of the phase conductors are effected at the joint 20 shown in detail in FIG. 2. The housing 21 of the electrical and optical joint between the conductors 1 and their optical fibres 18 is supported on the cross-arm 7; the housing 21 of the electrical and optical joint 20 between the conductors 2 and their optical fibres 18 is supported on the cross-arm 8; and the housing 21 of the electrical and optical joint 20 between the conductors 3 and their optical fibres 18 is supported on an auxiliary cross-arm 9. Details of the electrical and optical joint 20 between the conductors 1 and their optical fibres 18 will now be described with reference to FIG. 2.

The electrical and optical joint 20 comprises a cylindrical tubular housing 21 of procelain which is mounted on the cross-arm 7 with its axis substantially vertical and which is closed at its lowermost end by a metal end plate 22 and is closed at its uppermost end by a metal housing 23 comprising a flat base 24 and, detachably secured to the base, a separately formed dome 25 of substantially hemispherical shape. The circumferentially extending wall of the housing 21 has outwardly extending circumferential sheds 26 at spaced positions along its length. The metal end plate 22 is earthed. The housing 21 is filled with mineral insulating oil 31 which is maintained at a positive pressure by means of a pressure tank 32.

Each overhead conductor 1 passes into, and effects a fluid-tight seal with the wall of, the dome 25. The base 24 and dome 25 of the metal housing 23 may suffice to carry current between the two conductors 1 but, if desired, in addition a strap of electrically conductive metal or metal alloy (not shown) may be secured to the metal housing and electrically interconnected between the two conductors. The optical cable element protrudes from the cut back end of each conductor 1 and its plastic tube 17, in which is loosely housed the optical fibre 18, passes through and effects a substantially fluid-tight seal with an end cap 28 of an elongate enclosure 27 of plastic material in which the joint 30 between the optical fibres 18 of the optical cable elements is housed and which is supported on the base wall 24 of the metal housing. The enclosure 27 is filled with petroleum jelly 29.

The base wall 24 of the metal housing 23 supports a circumferentially continuous ring 33 of metal or metal alloy which encircles the procelain housing 21 and serves as a corona ring.

The electrical and optical joints between the conductors 2 and their optical fibres 18 and between the conductors 3 and their optical fibres 18 are substantially identical to the electrical and optical joint shown in FIG. 2.

FIG. 3 shows a diagrammatic side view of an optical joint between an optical fibre 63 protruding from a plastic tube 62 of the optical cable element of an overhead phase conductor 61 suspended from a tower (not shown) and an optical fibre 73 protruding from a plastic tube 72 of the optical cable element of an optical cable 71 extending to a sub-station (not shown). The optical joint 40 comprises a cylindrical tubular housing 41 of procelain which is mounted on a cross-arm 57 of the tower with its axis substantially vertical and which is closed at its lowermost end by a metal end plate 42 and at its uppermost end by a metal housing 43 comprising a flat base 44 and, detachably secured to the base, a separately formed dome 45 of hemispherical shape. Outwardly extending circumferential sheds 46 are provided at spaced positions along the length of the circumferentially extending wall of the housing 41.

At the lowermost end of the procelain housing 41, the optical cable 71 effects a fluid-tight seal 54 with the metal end plate 42 and the optical cable element of the optical cable comprising the plastic tube 72 in which is loosely housed the optical fibre 73 passes upwardly through the procelain housing and into the metal housing 43, making a substantially fluid-tight seal 55 with the base wall 44 of the metal housing. The overhead phase conductor 61 passes through and effects a substantially fluid-tight seal with the dome 45 of the metal housing 43, the conductor being electrically connected to a phase conductor (not shown) suspended from the opposite side of the tower by a conventional jumper cable (not shown) which may extend between the other conductor and the metal housing. The plastic tube 62 of the optical cable element 62 of the overhead conductor passes through and makes a fluid-tight seal with one end cap 48 of an elongate enclosure 47 of plastic material. The plastic tube 72 of the optical cable element of the optical cable 71 passes through and effects a fluid-tight seal with the other end cap 48 of the enclosure 47 and the optical fibres 63 and 73 of the overhead phase conductor and optical cable are jointed at the optical fibre joint 50 housed in the enclosure. The plastic enclosure 47 is filled with petroleum jelly 49 and is supported and spaced from the flat base 44 of the metal housing. The porcelain housing 41 is filled with mineral insulating oil 51 which is maintained at a positive pressure by means of a pressure tank 52. The flat base 44 of the metal housing 43 supports a circumferentially continuous ring 53 of metal or metal alloy which encircles the porcelain housing 41 and serves as a corona ring.

FIG. 4 shows a preferred form of fluid-tight seal arrangement 54 by means of which an optical cable 71 is fed into the insulating housing 41 of a joint of the kind shown in FIG. 3. In the arrangement illustrated it is assumed that the optical cable 71 has three optical cable elements each comprising a plastic tube 72 in which is loosely housed an optical fibre 73. As will be seen on referring to FIG. 4, the cable 71 is cut back to expose lengths of the plastic tube 72, a sleeve 80 of heat-shrunk plastic material surrounds the cut-back end of the cable and the sleeved cut-back end of the cable passes through a two-part gland 81, one part 82 of which is screwed into a tapped hole in the base 42 of the housing 41 into the housing. An 'O'-ring 85 of elastomeric material is housed in the part 82 of the gland 81 and is compressed around the cable 71 by the part 83 of the gland and the gland washer 84 to effect a fluid-tight seal between the cable and the base 42. The exposed end of the cable 71 is sealed by a body 86 of epoxy resin which is housed in a protruding part 87 of the sleeve 80 of heat-shrunk plastic material.

What we claim as our invention is:

1. In an overhead electric transmission system of the kind in which there is freely supported in long lengths between towers mutually spaced along the system at least one overhead electric conductor which includes at least one optical fibre for the transmission of light, a joint between optical fibres of two overhead electric conductors suspended from a tower, or between optical fibres of an overhead electric conductor suspended from a tower and of a cable extending to a location spaced from the tower, in which each or the overhead electric conductor constitutes a live conductor of the system, which joint is enclosed within a substantially fluid-tight housing of metal or metal alloy, the housing being electrically connected to each or the said overhead electric conductor, being electrically insulated from earth, and having an external shape of such a form as to provide effective control of electrical stress.

2. An optical fibre joint as claimed in claim 1, wherein the metal housing comprises a substantially flat base and, detachably secured to the base, a separately formed dome of substantially hemi-spherical shape.

3. An optical fibre joint as claimed in claim 1, wherein the metal housing is mounted on the upper end of an upstanding elongate housing which is made of electrically insulating material and which has a lower end wall.

4. In an overhead electric transmission system of the kind in which there is freely supported in long lengths between towers mutually spaced along the system at least one overhead electric conductor which includes at least one optical fibre for the transmission of light, a joint between optical fibres of two overhead electric conductors suspended from a tower, or between optical fibres of an overhead electric conductor suspended from a tower and of a cable extending to a location spaced from the tower, in which each or the overhead electric conductor constitutes a live conductor of the system, which joint is enclosed within a substantially fluid-tight housing of metal or metal alloy and which housing is electrically connected to each or the said overhead electric conductor, comprises a substantially flat base and, detachably secured to the base, a separately formed dome of substantially hemi-spherical shape, and is mounted on the upper end of an upstanding elongate housing which is mounted on the tower, which is made of electrically insulating material and which has a lower end wall.

5. An optical fibre joint as claimed in claim 4 in which the optical fibres connected at the joint are components of an overhead electric conductor and of a cable extending to said location spaced from the tower, wherein the or each optical fibre of the cable passes into the insulating housing through the lower end wall of the housing, extends upwardly through the insulating housing and enters the metal housing mounted on the upper end of the insulating housing through the base of the metal housing.

6. An optical fibre joint as claimed in claim 5, wherein the lower end wall of the insulating housing is of electrically conductive metal or metal alloy and is earthed.

7. An optical fibre joint as claimed in claim 6, wherein the insulating housing is at least partially filled with an electrically insulating medium in a fluid or semi-fluid state.

8. An optical fibre joint as claimed in claim 7, wherein the electrically insulating medium in the insulating housing is an insulating oil or an insulating gas which fills the housing and is maintained at a positive pressure.

9. An optical fibre joint as claimed in claim 7, wherein the electrically insulating medium in the insulating housing is a petroleum-based insulating grease.

10. An optical fibre joint as claimed in any one of claims 3 to 9, wherein the insulating housing has at spaced positions along its length outwardly extending circumferential sheds.

11. An optical fibre joint as claimed in any one of claims 3 to 9, wherein the metal housing supports a circumferentially continuous ring of metal or metal alloy which encircles the insulating housing and serves as a corona ring.

12. An optical fibre joint as claimed in claim 1 or 4 in which the optical fibres connected at the joint are components of two overhead electric conductors, wherein the electrical interconnection between the two conductors is supplemented by at least one strap of electrically conductive metal or metal alloy secured to the metal housing and electrically interconnected between the two overhead conductors.

13. An optical fibre joint as claimed in claim 1 or 4, wherein the or each joint between the optical fibres is itself housed in a substantially fluid-tight enclosure of plastic material, which enclosure is supported within the metal housing.

14. An optical fibre joint as claimed in claim 13, wherein the plastic enclosure is filled with water-impermeable material of a grease-like nature and each optical fibre effects a substantially fluid-tight seal with a wall of the plastic enclosure.

15. An optical fibre joint as claimed in claim 1 or 4, wherein the metal housing also accommodates ancilliary equipment associated with the optical communication system.

* * * * *